United States Patent [19]
Alexander

[11] 3,863,224
[45] Jan. 28, 1975

[54] SELECTIVELY CONTROLLABLE SHIFT REGISTER AND COUNTER DIVIDER NETWORK

[75] Inventor: Harry Arnold Alexander, Waynesboro, Va.

[73] Assignee: General Electric Company, Salem, Va.

[22] Filed: Jan. 30, 1973

[21] Appl. No.: 327,941

[52] U.S. Cl. ...... 340/172.5, 235/92 SH, 235/92 PE, 328/37, 328/48

[51] Int. Cl. ... G06f 7/39, H03k 21/36, H03k 23/02

[58] Field of Search 340/172.5; 235/92 DM, 92 SH, 235/92 PE, 92 CC; 328/37, 48, 129

[56] References Cited

UNITED STATES PATENTS

| | | | |
|---|---|---|---|
| 2,896,848 | 7/1959 | Miehle | 235/167 |
| 3,230,352 | 1/1966 | Groundin et al. | 235/156 |
| 3,283,131 | 11/1966 | Carbrey | 235/164 |
| 3,376,410 | 4/1968 | Lundin | 235/92 |
| 3,413,452 | 11/1968 | Schlein | 235/92 CC |
| 3,534,398 | 10/1970 | Wajda | 235/92 |
| 3,538,442 | 11/1970 | Arkell et al. | 328/39 |
| 3,581,066 | 5/1971 | Maure et al. | 235/92 |
| 3,594,551 | 7/1971 | Shearer | 235/92 PL |
| 3,614,631 | 10/1971 | Beuier et al. | 328/48 |
| 3,659,274 | 4/1972 | Kyser | 340/172.5 |
| 3,733,471 | 5/1973 | Gilberg | 235/92 NG |

*Primary Examiner*—Harvey E. Springborn
*Assistant Examiner*—James D. Thomas
*Attorney, Agent, or Firm*—Robert E. Brunson; Arnold E. Renner

[57] ABSTRACT

A shift register counter, receiving sequentially applied signals, is selectively controllable to divide the signals by selected divide numbers to generate an output signal representative of the input signals divided by a selected divide number.

7 Claims, 6 Drawing Figures

SELECTIVELY CONTROLLABLE SHIFT REGISTER AND COUNTER DIVIDER NETWORK

BACKGROUND OF THE INVENTION

This invention relates generally to shift register and counter networks and more particularly to counter divider networks of the type which receive sequentially applied signals and generate an output signal when a specified number of signals have been received.

FIELD OF THE INVENTION

In the field of digital equipment design, such as digital computers, numerical control equipment, industrial process control equipment, and the like, shift register counters are frequently used to count sequentially occurring input signals and to generate an output signal to perform a control function when a specified number of the signals have been counted. These counters are each designed to generate an output signal in response to a specified count. As a result, they have limited usage because they do not provide the capability of generating an output signal in response to more than one count.

Further, many digital equipment designs are such that a single counter could be time shared to perform several functions in the equipment if the counter could selectively generate an output signal in response to a plurality of counts. The field of this invention relates to such a single counter which has universal application in all types of digital equipment designs.

DESCRIPTION OF THE PRIOR ART

Shift register counters, sometimes referred to as feedback counters, are well-known in the art for their application as modulo N dividers. These counters are comprised of a plurality of binary cells or flip-flop stages interconnected in a shift register fashion to count a series of sequentially applied input signals which are applied to the flip-flops. These counters all have a preset input associated with each of the flip-flops for initializing the flip-flops to predetermined binary states prior to the beginning of a count or divide sequence by the counter. The counters also possess some type of a detection means connected to the output terminals of the flip-flops to develop a signal whenever a specified count has been reached in the counter. Using a four-stage counter as an example, there are 15 usable states, the binary state 0000 in the flip-flops being a forbidden combination or state of the counter. To divide by some specified number, these counters count either up or down from some predetermined count placed in the counter. The counter is activated to count and when a particular state or count is achieved, the output means generates an output signal representative of the number of input signals divided by the specified number.

Most shift register counters are wired to divide by only one specified number. However, one known prior art shift register counter can be programmed from an external source to divide by any number 2 through 15. Like all prior art shift register counters, this counter also has a forbidden 0000 state. In the operation of this counter, a common preset input is applied to each of the stages of the counter to place the counter in an all binary 1 state. Also, a separate control input signal is provided to each of the flip-flops to control the counter to establish the number by which it is to divide. This counter is designed to detect the binary 1111 state only once during a fifteen state divide sequence. As a result, the output of the counter occurs only once during any 15 state sequence. In operation, the desired control input signals are applied to flip-flops and the counter is activated to begin its divide or count operation. The counter will count until the all binary 1 state is recognized, at which time an output signal is generated. Since there is a forbidden state in this counter divider, it cannot divide by 16. In order to divide by any number greater than 15, in all known prior art counters, it is necessary to cascade more than two of these together such that the output signal of one counter feeds to the signal input terminal of the other counter.

The above prior art counters have several disadvantages. For example, since each of them contains a forbidden state, such as 0000, a common reset cannot be used. Further, a separate divide number is required for each of the flip-flops to establish a specified number in the counters for divide purposes, thus requiring additional input pins for the circuit designs. Also, the forbidden state of the counter presents a lockup condition which must be avoided in the counter design. Since the possibility of this forbidden state is likely to occur in any counter, additional logic is required to detect this condition to insure that the counter is always placed into a proper initialized or preset state should this condition occur. Additionally, since these counters can only divide by maximum of 15, it is necessary to cascade two or more in order to divide by numbers greater than 15.

In view of the above disadvantages, it is desirable to provide a modulo N divider shift register counter network which does not have any forbidden operational states which may be easily reset and easily expanded to divide by numbers larger than the number of specified states by which the counter is capable of containing.

SUMMARY OF THE INVENTION

The present invention overcomes these problems of the prior art by providing a shift register counter modulo N divider network which is selectable to divide any number of sequentially applied input signals by any number, 2 through N, whereby all states of the counter are utilized. The counter always starts off in a reset state. A decode means decodes the various states of the counter during its operation and selectively provides divide numbers or signals to a single input of the counter to control its states during a divide sequence. A select means selectively provides enabling signals to the decode means for enabling the latter during a divide sequence to allow the proper generation of the divide signals for the counter. The enable signals from the select means essentially establish various ones of the divide numbers by which the input signal applied to the counter is to be divided.

The divider of the present invention, as well as being able to divide by any number, 2 through N, also includes control means for dividing by any number N, wherein that number is equal to or less than 2N. This is accomplished in the divider of the present invention by sequentially dividing by two numbers, the total of which is equal to the number 2N. The control means and the select means provide this capability by first causing the counter to divide by a first number N and storing the result of the division, and then dividing by a second number N and detecting the termination or result of this second division and generating an output signal representative of the number of input signals applied to the counter divided by 2 times the number N.

An output mean is also provided for generating an output signal each time the counter achieves a predetermined state. This output signal is always representative of the number of input signals applied to the counter divided by the divide number selected by the select means.

When it is desirable to divide by any number greater than 2N, two or more of the counters of the present invention may be connected in cascade. When connected in this manner, the output signal of one of the counters is applied to the input of the next counter, causing the latter to count. The select means of a first divider network is capable of receiving control signals from the select means of a second network to control the selection of divide numbers in the first network. By connecting the divider networks together in this fashion, both dividers may then sequentially divide by two numbers, wherein the two numbers in each of the counters of the dividers represents the sum total of the number by which the sequentially applied input signals to the first network are to be divided.

It is, therefore, an object of the present invention to provide a shift register modulo N divider network having enhanced operating capabilities.

It is another object to provide a modulo N divider network of the preceding type which does not require preselected input signals.

It is a further object to provide a selectable shift register counter modulo N divider capable of dividing by any number 2 through N.

Another object is to provide a shift register counter for counting sequentially applied input signals and selectively dividing the input signals by numbers selectively specified to a single input to the counter.

Still a further object is to provide a register counter modulo N divider having select means for selectively enabling the divider to divide by any number 2 through N.

Still another object is to provide a modulo N divider network including decode means for decoding outputs of a counter in the network to provide divide signals to the counter for dividing sequentially applied input signals by the divide numbers specified by the divide signals.

It is still a further object to provide a shift register counter modulo N divider circuit capable of dividing by a number greater than the number of binary states of the counter.

The foregoing and other objects and advantages of the present invention will become apparent as this description proceeds and the features of novelty which characterize the invention will be pointed out in particularity in the claims annexed to and forming a part of the specification.

BRIEF DESCRIPTION OF THE DRAWING

The present invention may be more readily described and understood by reference to the accompanying drawing in which.

DESCRIPTION OF THE PREFERRED EMBODIMENT

Figure 1:
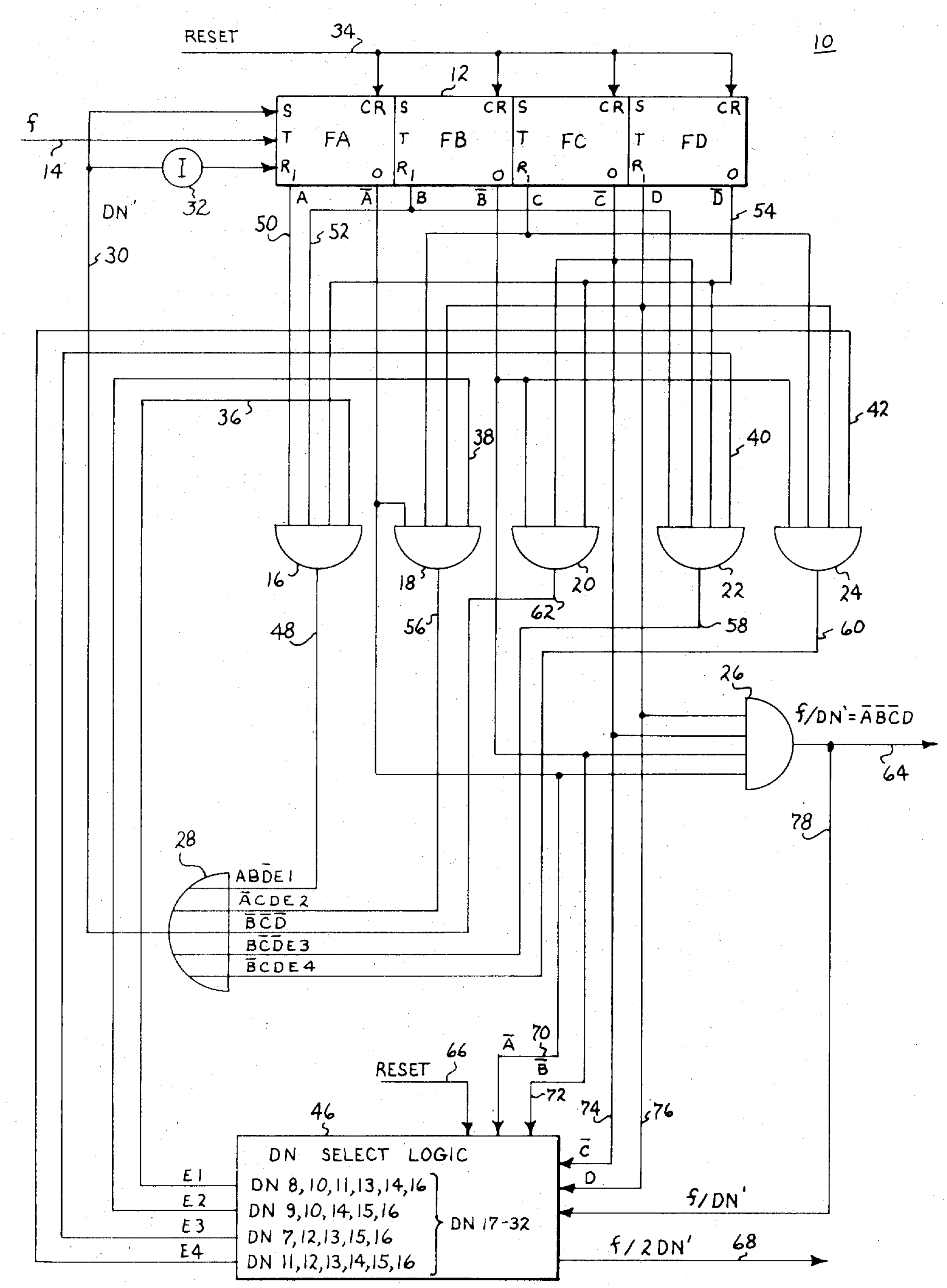
FIG. 1 is a logic schematic of a shift register counter modulo N divider network in accordance with the present invention.

Reference is now made to FIG. 1 which shows a shift register counter modulo N divider network, generally designated 10, in accordance with the present invention. The network contains a shift register or counter 12 comprised of a plurality of stages of binary cells or flip-flops designated FA, FB FC and FD. The counter 12 is of the well-known type whereby the output of each stage of the counter is connected to the appropriate input terminals of the next stage such that each flip-flop stage will assume the state of the previous stage whenever triggered by an input signal *f* applied to the counter on a line 14. A decode network is comprised of a plurality of logic elements or AND gates 16, 18, 20, 22, 24, 26 and an OR gate 28. The OR gate 28 generates a divide signal representative of a divide number DN′ on a conductor 30 which is connected to a set or S input terminal of flip-flop FA and to the input terminal of an inverter 32. An output terminal of inverter 32 is connected to a reset or R input terminal of flip-flop FA. The signal DN′ is applied to the S input terminal of flip-flop FA and to the inverter 32 to control the flip-flop during a count or divide operation. Each of the flip-flops FA-FD also contains a common reset terminal CR which receives a reset input signal via a conductor 34.

Each of the AND gates 16, 18, 20, 22 and 24 have their input terminals connected to specified ones of the flip-flops FA-FD. These AND gates are utilized during the divide operation of the present invention to generate the proper output signals for input to OR gate 28 to control the divide operation. Further, each of the AND gates 16, 18, 22 and 24 additionally receive an input enable signal designated, respectively, E1, E2, E3, E4 on conductors 36, 38, 40 and 42, respectively. These enable signals are generated by an DN (Divide Number) select logic 46. When activated in a specified manner, the DN select logic 46 provides selected ones of the enable signals E1–E4 to the associated ones of the AND gates 16, 18, 22 and 24.

There is shown in the DN select logic 46, immediately adjacent each of the output enable signals E1–E4, a plurality of divide numbers. Adjacent output enable signal E1 there is shown divide numbers DN8, 10, 11, 13, 14 and 16. Whereas, adjacent E2 there is shown DN9, 10, 14, 15 and 16. Adjacent E3 are divide numbers DN7, 12, 13, 15 and 16 and adjacent E4 are the numbers DN11, 12, 13, 14, 15 and 16. These DN numbers designate that a signal appears on each of their corresponding adjacent lines for a particular divide number selected by the DN select logic. For example, if the divider is to divide by the number 8, then the signal DN8 will activate line E1 which, in turn, will provide an enable signal to one input terminal of AND gate 16. AND gate 16 is thus placed in a condition to be enabled whenever the appropriate input signals from the counter 12 are generated.

By referring to the output of AND gate 16 on a conductor 48, it can be seen that the terms required to enable that gate are A B $\bar{D}$ E1. During the divide operation, when flip-flop FA is in a set condition, a binary 1 logic signal A from a 1 output terminal of the flip-flop will be applied to the input of AND gate 16 on a conductor 50. In a similar fashion when flip-flop FB is in a set state a signal B will be applied via conductor 52 to gate 16. Also, since the term specifies $\bar{D}$, when flip-flop FD is in a reset state its 0 output terminal will be a binary 1 providing the $\bar{D}$ signal via conductor 54 to the input of gate 16. When these conditions are satisfied (A B $\bar{D}$ E1), gate 16 is enabled which, in turn, causes OR gate 28 to generate the DN′ signal for application to the input of flip-flop FA. AND gates 18, 20, 22 and 24 all operate in a similar fashion to AND gate 16.

An output signal from AND gate 18 is provided to the input of OR gate 28 on conductor 56 whereas AND gate 22 provides an output signal on conductor 58 and AND gate 24 provides an output signal on conductor 60. Referring to AND gate 20, it is seen that the terms required to enable this gate are $\bar{B}$ $\bar{C}$ $\bar{D}$ as shown on conductor 62 at the input of OR gate 28. AND gate 20 does not receive an enable input signal as do the other AND gates 16, 18, 22 and 24. The purpose of this will subsequently be described.

One of the output signals from the network of FIG. 1 is provided by AND gate 26. Specified ones of the output terminals of the flip-flops FA–FD provide input signals to AND gate 26. The signals or terms required to enable AND gate 26 are shown on output conductor 64. It will be noted that each time the counter 12 achieves the binary state of $\bar{A}$ $\bar{B}$ $\bar{C}$ $\bar{D}$ that gate 26 is enabled to provide an output control signal *f*/DN′ for external use. The output signal from gate 26, as shown in FIG. 1, is representative of the number of sequentially applied input signals *f* divided by the number DN′ as specified by the DN select logic 46. For example, if the counter is to divide by the number 5, AND gate 26 will be enabled after the counter has received five input signals f on conductor 14.

Referring again to the DN select logic 46, the signals $\bar{A}$, $\bar{B}$, $\bar{C}$, D and *f*/DN′ are provided as inputs on conductors 70, 72, 74, 76 and 78, respectively. An additional output signal from the network 10 is provided from the select logic 46 on a conductor 68 designated *f*/2DN′.

Figure 2:
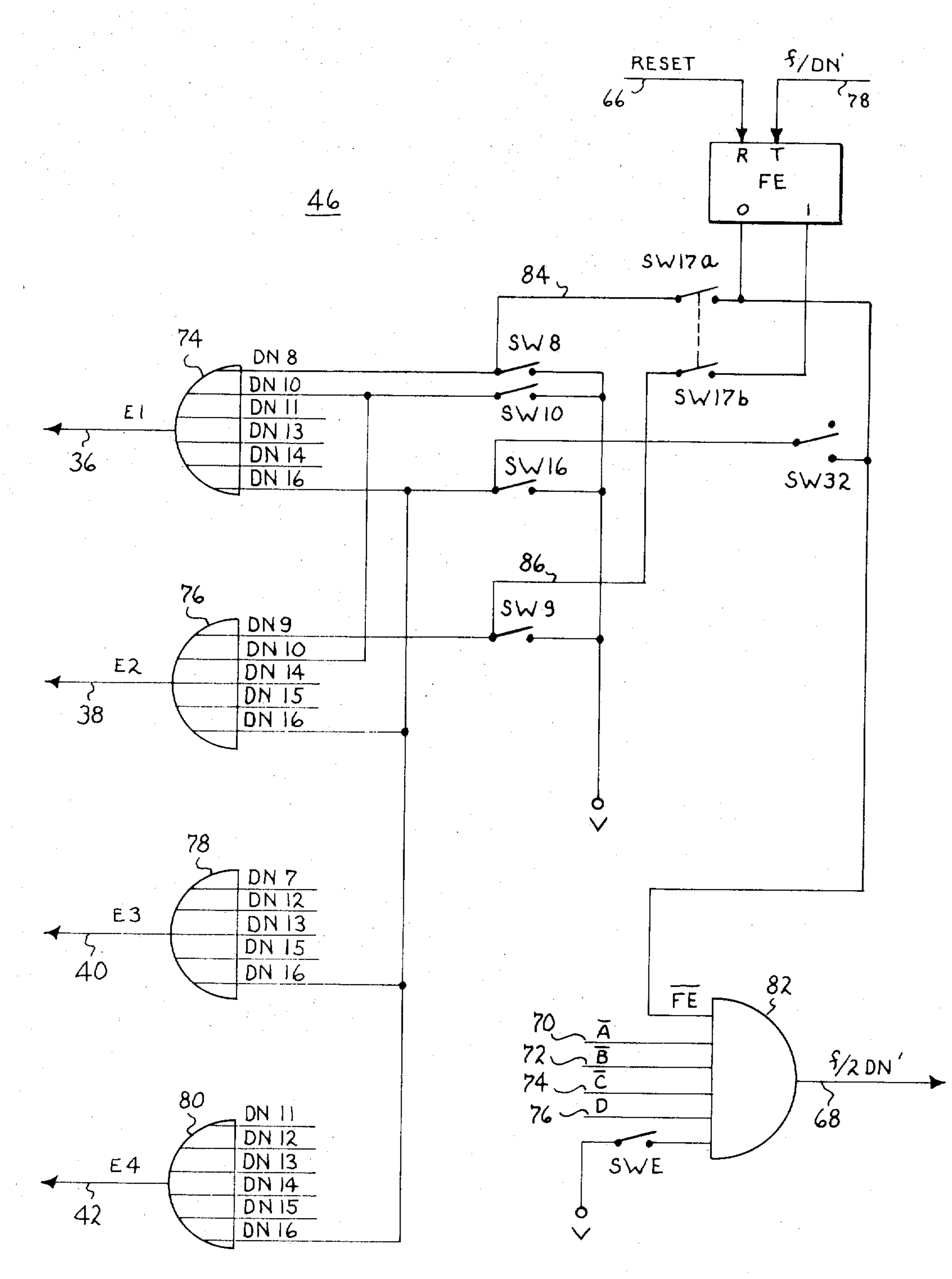
FIG. 2 is a logic schematic of the select means of the present invention.

Reference is now made to FIG. 2 which shows in detail the DN select logic 46 of FIG. 1. Each of the enable signals E1–E4 is generated by an associated one of a plurality of OR gates 74, 76, 78 and 80, respectively. The OR gates receive a divide number (DN) input signal on each of their input terminals for generating the appropriate ones of the enable signals E1–E4 when particular ones of the divide numbers are selected. For example, when it is desirable to divide by 8, signal E1 is generated as a binary 1 by OR gate 74 when a switch SW8 is in the closed position. With SW8 in the closed position, a signal DN8 is provided to the input of the OR gate from a voltage source V to generate signal E1.

Still referring to FIG. 2, there is shown a control means or flip-flop FE which receives at its T input terminal the signal *f*/DN′ from AND gate 26 on conductor 78 (FIG. 1). A reset input signal on conductor 66 is applied to an R or reset terminal of flip-flop FE. The purpose of the FE flip-flop is to control the divide operation when it is desirable to divide by a number greater than the number of states of which the counter 12 is capable of achieving. The manner in which this is done will be described in the description of the operation of the invention. The select logic 46 also contains an AND gate 82 for generating the output signal *f*/2DN′. As can be seen, the input terms or signals ($\bar{A}$ $\bar{B}$ $\bar{C}$ D) for generating this output signal come from the flip-flop stages FA–FD of the counter 12 on conductors, 70, 72, 74 and 76, respectively. These latter terms could be replaced by the single term or signal *f*/DN′ by connecting conductor 78 to the input of AND gate 82. Also, an enable signal $\overline{FE}$ is provided as one input to AND gate 82 from a 0 output terminal of the flip-flop FE. Though not required for the operation of AND gate 82, an enable switch SWE provides an input signal to the gate from a voltage source V when closed. Switch SWE may be utilized in those situations where it is desirable to disable the AND gate 82. In order to accomplish this, switch SWE would be placed in the open position thus preventing gate 82 from being enabled.

Reference is again made to FIG. 1. When dividing by specified numbers as selected by the select logic 46, one or more of the enable signals E1–E4 are generated by the select logic to enable the appropriate one(s) of the AND gates 16, 18, 22 and 24. As each of the AND gates is enabled, it generates the proper output signal to OR gate 28 which, in turn, provides the proper DN′ signals for controlling the operation of the counter 12. The following table of equations are presented to clarify how the various output terms or signals from each of the AND gates 16, 18, 20, 22 and 24 are generated for each of the divide numbers DN′ selected by the select logic 46.

EQUATIONS FOR DIVIDE BY N

| DN′ | TERMS |
|---|---|
| 2 | $= \bar{A}$ |
| 3 | $= \bar{A}\,\bar{B}$ |
| 4 | $= \bar{B}$ |
| 5 | $= \bar{B} + \bar{C}$ |
| 6 | $= \bar{B}\,\bar{C}\,\bar{D}$ |
| 7 | $= \bar{B}\,\bar{C}\,\bar{D} + \bar{B}\,C\,\bar{D}\,E3$ |
| 8 | $= \bar{B}\,\bar{C}\,\bar{D} + A\,B\,\bar{D}\,E1$ |
| 9 | $= \bar{B}\,\bar{C}\,\bar{D} + \bar{A}\,C\,D\,E2$ |
| 10 | $= \bar{B}\,\bar{C}\,\bar{D} + A\,B\,\bar{D}\,E1 + \bar{A}\,C\,D\,E2$ |
| 11 | $= \bar{B}\,\bar{C}\,\bar{D} + A\,B\,\bar{D}\,E1 + \bar{B}\,C\,D\,E4$ |
| 12 | $= \bar{B}\,\bar{C}\,\bar{D} + \bar{B}\,C\,D\,E4 + B\,\bar{C}\,\bar{D}\,E3$ |
| 13 | $= \bar{B}\,\bar{C}\,\bar{D} + A\,B\,\bar{D}\,E1 + \bar{B}\,C\,D\,E4 + B\,\bar{C}\,\bar{D}\,E3$ |
| 14 | $= \bar{B}\,\bar{C}\,\bar{D} + A\,B\,\bar{D}\,E1 + \bar{A}\,C\,D\,E2 + \bar{B}\,C\,D\,E4$ |
| 15 | $= \bar{B}\,\bar{C}\,\bar{D} + \bar{A}\,C\,D\,E2 + \bar{B}\,C\,D\,E4 + B\,\bar{C}\,\bar{D}\,E3$ |
| 16 | $= \bar{B}\,\bar{C}\,\bar{D} + A\,B\,\bar{D}\,E1 + \bar{A}\,C\,D\,E2 + \bar{B}\,C\,D\,E4 + B\,\bar{C}\,\bar{D}\,E2$ |
| 17 . . 32 | any combination of DN′ = 6 — DN′ = 16 which equals the desired number |
| 33 . . N | connect counters in cascade with selected feedback to achieve desired divide |

For simplicity purposes, the logic structure shown in FIG. 1 illustrates a divider network which is capable of dividing by any number from 6–16. This is apparent by referring to the above table which shows that the terms for DN′ = 2 through DN′ = 5 do not appear in FIG. 1. The development of a divider for dividing by these numbers has not been shown in FIG. 1 since it is considered that those having ordinary skill in the art could quite easily design a divide network for dividing by these low numbers. For example, as shown for DN′ = 2, only one flip-flop such as FA is required as indicated ›y the term $\overline{A}$ in the table. Where DN' = 3 or 4, only a two-stage counter using flip-flops FA and FB would be required. To design a counter which would divide by 5, it is merely necessary to provide three stages such as FA, FB and FC.

The operation of the invention will be described first using a single divider network to divide a sequentially applied series of input signals *f* on conductor 14 by an exemplary number 10. The operation of the single divider network will then be described with the counter dividing by the number 17. It is apparent by observation of FIG. 1 that the counter 12 is capable of achieving only 16 states, thus the count of 17 physically exceeds the maximum number which the counter is capable of holding. However, this division may be readily accomplished by the unique design of the present invention.

The operation of divide by 10 will be explained by reference to FIGS. 1, 2 and 5 in combination. From the preceding table, it is seen that the number 10 requires three terms from AND gates 16, 18 and 20 to control the operation of the counter 12. That is, OR gate 28 will be enabled to generate the divide number signal DN' whenever any one of these terms is present at its input. To enable the counter to divide by 10, the proper enable signals are set up in the DN select logic as shown in FIG. 2. a switch SW10 is placed in the closed condition, thus applying an enable signal from the voltage source V to the DN10 input terminal of each of the OR gates 74 and 76. Thus, the two enable signals E1 and E2 are generated and simultaneously applied to AND gates 16 and 18, respectively. AND gates 16 and 18 are now conditioned to be enabled when the additional inputs from the counter 12 satisfy the required terms. All of the other switches SW8, SW16, SW9, SW17, SW32 and SWE of FIG. 2 are in the open position.

With the above conditions established, let it first be assumed that a reset signal on conductor 34 is applied to the CR input terminal of each of the flip-flops FA–FD. This reset signal places the counter 12 in a binary 0000 state. With the counter 12 reset, AND gate 20 is first enabled by the input signals $\overline{B}$ $\overline{C}$ $\overline{D}$. Thus, the output signal on conductor 62 from AND gate 20 enables OR gate 28 to generate a binary 1 signal DN' on conductor 30 to the S input terminal of flip-flop FA. This binary 1 signal to FA prepares the flip-flop to achieve a set condition upon the application of the first signal *f* on conductor 14.

Figure 5:
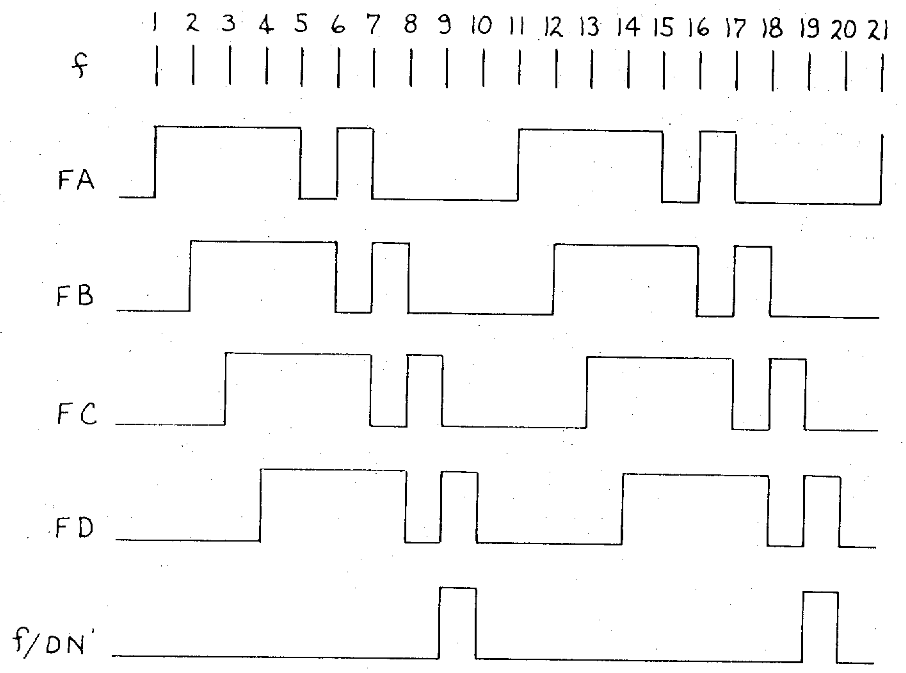
FIGS. 5 and 6 are timing diagrams useful in understanding the operation of the invention.

Reference is now made to FIG. 5 which shows the timing relationships between each of the flip-flops FA–FD and also, the generation of the output signal *f*/DN' as the input signal *f* is sequentially applied to the input terminal T of flip-flops FA–FD. Referring to the left side of FIG. 5, each of the flip-flops FA–FD are shown to be in the reset state as established by the reset signal on conductor 34. When the first signal *f* is applied to the counter, flip-flop FA will change from the reset to the set state as shown in FIG.. 5. When the second signal *f* is applied to the counter, flip-flop FB will set, thus taking on the state of flip-flop FA. It is significant to note at this time that flip-flop FA remains in the set condition because the term $\overline{B}$ $\overline{C}$ $\overline{D}$ is still present enabling OR gate 28, thus keeping flip-flop FA in the set state. As flip-flop FB sets, AND gate 20 is disabled and simultaneously AND gate 16 is enabled by the signals A B $\overline{D}$ E1. As a result, the signal DN' remains in the binary 1 condition from OR gate 28, keeping flip-flop FA in the set state. The third signal *f* applied to the counter causes the flip-flop FC to take on the state of flip-flop FB. At this time, the AND gate 16 is still in the enabled state keeping flip-flop FA in the set condition. The fourth signal *f* causes flip-flop FD to achieve a set state taking on the state of flip-flop FC. The setting of flip-flop FD causes AND gate 16 to be disabled, thus disabling OR gate 28 and causing its output to go to a binary 0. Inverter 32 now provides the complement of the signal DN' to the R input terminal of flip-flop FA as a binary 1 signal. As a result, the fifth input signal *f* causes flip-flop FA to achieve a reset state.

When flip-flop FA achieves the reset state, AND gate 18 is enabled by the input terms $\overline{A}$ C D E2. This again enables OR gate 28 to provide a binary 1 signal on conductor 30 to the S input terminal of flip-flop FA. The sixth input signal *f* will thus cause flip-flop FA to again achieve a set state and simultaneously cause flip-flop FB to reset in accordance with the reset state of flip-flop FA. Flip-flops FC and FD remain in the set state since each of their preceding flip-flops are in the set state. With flip-flop FA now in the set state, AND gate 18 is disabled, causing the output of OR gate 28 to generate a binary 0 signal which is inverted to a binary 1 signal through inverter 32. The seventh input signal *f* causes flip-flop FA to again achieve the reset state. Simultaneously, flip-flop FB will achieve a set state in accordance with the previous state of flip-flop FA and flip-flop FC will reset in accordance with the previous state of flip-flop FB. Flip-flop FD remains in the set state at this time.

During the application of the eighth, ninth, and tenth signals *f*, flip-flop FA will remain in the reset state as shown in FIG. 5. However, upon the application of the eighth input signal *f*, flip-flop FB will achieve a reset state in accordance with the state of FA, flip-flop FC will achieve a set state in accordance with the previous state of FB and flip-flop FD will achieve a set state in accordance with the previous state of FC. The ninth input signal *f* causes flip-flop FC to achieve a reset state and flip-flop FD to achieve a set state. It is significant to note at this time, upon the occurrence of the ninth input signal *f*, that the states of the flip-flops FA-FD are binary 0001, respectively. Referring to FIG. 1 and AND gare 26, it will be noted that the terms $\overline{A}$ $\overline{B}$ $\overline{C}$ D are those which satisfy the conditions to enable AND gate 26 to generate the output signal *f*/DN'. It is during the period between the occurrence of input signals 9 and 10 that flip-flop FD is in the set state and that the output signal *f*/DN' is generated. The trailing or falling edge of the signal *f*/DN' occurs on the tenth input signal *f* and may be used to perform a control function to drive another divider network or activate other electronic circuitry not shown.

When the tenth input signal *f* is applied to the counter, flip-flop FD achieves a reset state, returning the counter 12 to an all binary 0 state as shown in FIG. 5. The counter is now back to the original reset state as established at the beginning of the discussion whereby the term $\overline{B}$ $\overline{C}$ $\overline{D}$ is generated from AND gate 20 to enable OR gate 28 to repeat the process of counting and generating an output signal in response to the next succeeding ten input signals *f* applied to the counter. This repetitive process is shown in FIG. 5 by referring to input signals 11–21.

Figure 6:
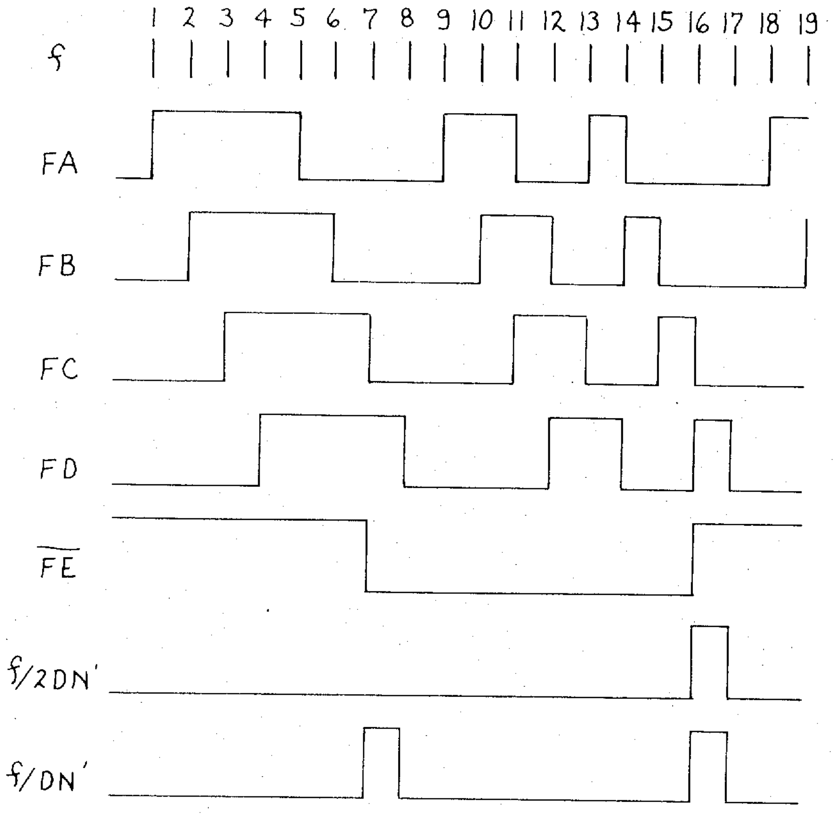

Reference is now made to FIGS. 1, 2 and 6 wherein the operation of the invention will be described dividing by the number 17. In the exemplary four-stage counter 12 of FIG. 1, the maximum number to which the counter is normally capable of counting is 16. The present invention, however, can extend this count capability by the utilization of the control element or flip-flop FE shown in FIG. 2. By making suitable connections between the output terminals of the flip-flop FE and selected ones of the input terminals of the OR gates 74–80, it is possible to divide by any number 17–32. In the present invention, this number is achieved by dividing by two numbers, the sum of which is greater than 16 and equal to or less than 32. Any combination of two numbers may be used to satisfy this requirement. As shown in FIG. 2, the two numbers selected to perform the division by 17 are DN8 and DN9. To perform this division, switches SW8, 10, 16, 9 and 32 are placed in the open position as shown. Switches SW17*a* and *b* and SWE are each placed in the closed position. The 0 output terminal of flip-flop FE is now connected through switch SW17*a* to the DN8 input of OR gate 74 via conductor 84. The 1 output terminal of flip-flop FE is now connected via switch SW17*b* to the DN9 input of OR gate 76 on conductor 86. With these switch connections established, it can readily be seen that when the flip-flop FE is in the reset or binary 0 state, a binary 1 signal is applied to the DN8 input of OR gate 74; thus enabling the latter to generate the output signal E1. When flip-flop FE is in the set state a binary 1 signal from its 1 output terminal is applied via switch SW17*b* to the DN9 input of OR gate 76 generating the signal E2.

The switch settings are now established in the DN select logic 46 to enable the divider to divide by the number 17 by first dividing by 8 and then dividing by 9. As previously described for the divide by 10 operation, let it first be assumed that the reset signal is applied to the counter 12 on a conductor 34 and further that the reset signal is also applied to the R terminal of flip-flop FE on conductor 66. Referring to FIG. 2, it can now be seen that the 0 output terminal of flip-flop FE is applying a binary 1 signal to the DN8 input of OR gate 74. As a result, the E1 signal is applied to AND gate 16 (FIG. 1) placing it in condition to be enabled when its other input signals from the counter 12 are generated.

Referring to FIG. 6, let it now be assumed that the first input signal *f* is applied on line 14 to the T input of each of the flip-flops FA–FD. This first signal causes flip-flop FA to achieve a set state. The reason for this is as previously described. That is, when the counter 12 is in the reset state, AND gate 20 is enabled generating the output term $\bar{B}$ $\bar{C}$ $\bar{D}$ which causes OR gate 28 to apply a binary 1 set signal to the input of flip-flop FA. With the next successive second, third, fourth and fifth input signals *f* the counter flip-flops FA–FD operate in the same manner as previously described when dividing by 10. Upon the occurrence of the fifth input signal *f*, however, flip-flop FA resets. This is because AND gate 16 was disabled when flip-flop FD established a set state with input signal number 4. As a result, OR gate 28 generates a binary 0 output signal which is inverted to a binary 1 through inverter 32 causing a reset of flip-flop FA. Upon the occurrence of the sixth input signal *f*, flip-flop FB will reset in accordance with the reset state of FA. In a similar fashion, flip-flop FC will reset on the seventh input signal and flip-flop FD will reset on the eighth input signal.

Reference is now made to FIGS. 1 and 6. As previously described, AND gate 26 is enabled in response to the signals $\bar{A}$ $\bar{B}$ $\bar{C}$ D from the counter 12. It is at the time of the occurrence of the seventh and eighth signals, that the signal *f*/DN′ appears at the output of AND gate 26 as shown in FIG. 6. Thus, indicating at the trailing edge of signal *f*/DN′ that the counter has made the first division by the number 8.

Referring now to FIG. 2, the *f*/DN′ signal on line 78 is applied to the T input terminal of flip-flop FE. As shown in FIG. 6, a signal $\overline{\text{FE}}$ indicates the signal level condition of the 0 output terminal of flip-flop FE. Since flip-flop FE was in the reset state at the beginning of the divide operation the *f*/DN′ signal causes the flip-flop to take on a set state, thus the 0 output terminal generates a binary 0 signal as shown by the signal $\overline{\text{FE}}$. It is at this time that the binary 0 signal from flip-flop FE is applied through SW17*a* to disable OR gate 74 removing the signal E1 from the AND gate 16. Simultaneously with the setting of flip-flop FE, its 1 output terminal generates a binary 1 signal which is applied through SW17*b* to the DN9 input of AND gate 76 enabling the latter to generate the output signal E2. In this manner, AND gate 18 is now placed in a condition to be enabled when its input signals from the counter 12 satisfy its input requirements.

Referring to AND gate 82 of FIG. 2 and to FC of FIG. 6, it will be noted that the flip-flop FE achieves a set state simultaneously with FC achieving a reset state. When flip-flop FC achieves a reset state, the input signals $\bar{A}$ $\bar{B}$ $\bar{C}$ D to the input of the AND gate 82 are true. However, since flip-flop FE sets at the same time flip-flop FC resets the input signal $\overline{\text{FE}}$ to AND gate 82 simultaneously becomes a binary 0 thus preventing AND gate 82 from being enabled.

Upon the occurrence of the eighth input signal *f*, flip-flop FD achieves a reset state in accordance with the state of FC. Thus, the counter 12 achieves an all binary 0's state generating the output signal $\bar{B}$ $\bar{C}$ $\bar{D}$ from AND gate 20. The divide network is now in a condition to start another divide operation wherein the divide by 9 operation will be performed. In a manner as previously described, the output signal DN′ from OR gate 28 will now cause flip-flop FA to take on a set state when the ninth input signal *f* is applied to the counter. The tenth input signal will cause flip-flop FB to take on a set state in accordance with the state of FA. When flip-flop FB achieves a set state, none of the input conditions to OR gate 28 are satisfied since none of the AND gates 16–24 are enabled. As a result, OR gate 28 generates a binary 0 output signal which is inverted again through inverter 32 to a binary 1 to reset flip-flop FA on the eleventh input signal *f*.

Simultaneously with the resetting of flip-flop FA, flip-flop FC takes on a set state in accordance with the state of FB. Flip-flop FB resets on the twelfth input signal and simultaneously flip-flop FD sets in accordance with the state of flip-flop FC. With flip-flop FA now reset, and flip-flops FC and FB in the set states, the input signals to AND gate 18 are appropriate to enable that gate to generate the output signal $\bar{A}$ C D E2. Thus, at this time, OR gate 28 again applies a binary 1 set signal to the input of flip-flop FA. Flip-flop FA will now set in response to the thirteenth input signal *f*. Simultaneously with the setting of FA, flip-flop FC resets in accordance with the state of flip-flop FB. The states of flip-flops FA, FC and FD are now such that AND gate 18 is disabled causing OR gate 28 to again generate a binary 0 output signal which effects the resetting of flip-flop FA on the fourteenth input signal. When flip-flop FA resets, flip-flop FB simultaneously takes on the set state in accordance with the previous state of flip-flop FA. At the same time that flip-flop FB sets, flip-flop FD takes on a reset state as specified by the state of flip-flop FC.

On the fifteenth input signal, flip-flop FB resets and flip-flop FC sets, and on the sixteenth input signal $f$ flip-flop FC resets and flip-flop FD sets. With flip-flop FD set, the state of the counter is proper to enable AND gate 26, thus generating the output signal $f$/DN' ($\bar{A}\ \bar{B}\ \bar{C}\ D$). When the signal $f$/DN' goes to a binary 1, it causes flip-flop FE to return to its original reset state. Flip-flop FE is now reset and its binary 0 output terminal is a binary 1 as shown in FIG. 6 thus applying signal $\overline{FE}$ to the input of AND gate 82. It is at this time that AND gate 82 is enabled to generate the output signal $f$/2DN'. The divider has now divided by the second number 9. The total of the two numbers 8 and 9 equals 17. This is indicated in the term $f$/2DN' defining that output signal wherein $f$ is representative of the number of sequentially applied input signals divided by two divide numbers DN' (8 and 9).

Figure 3:
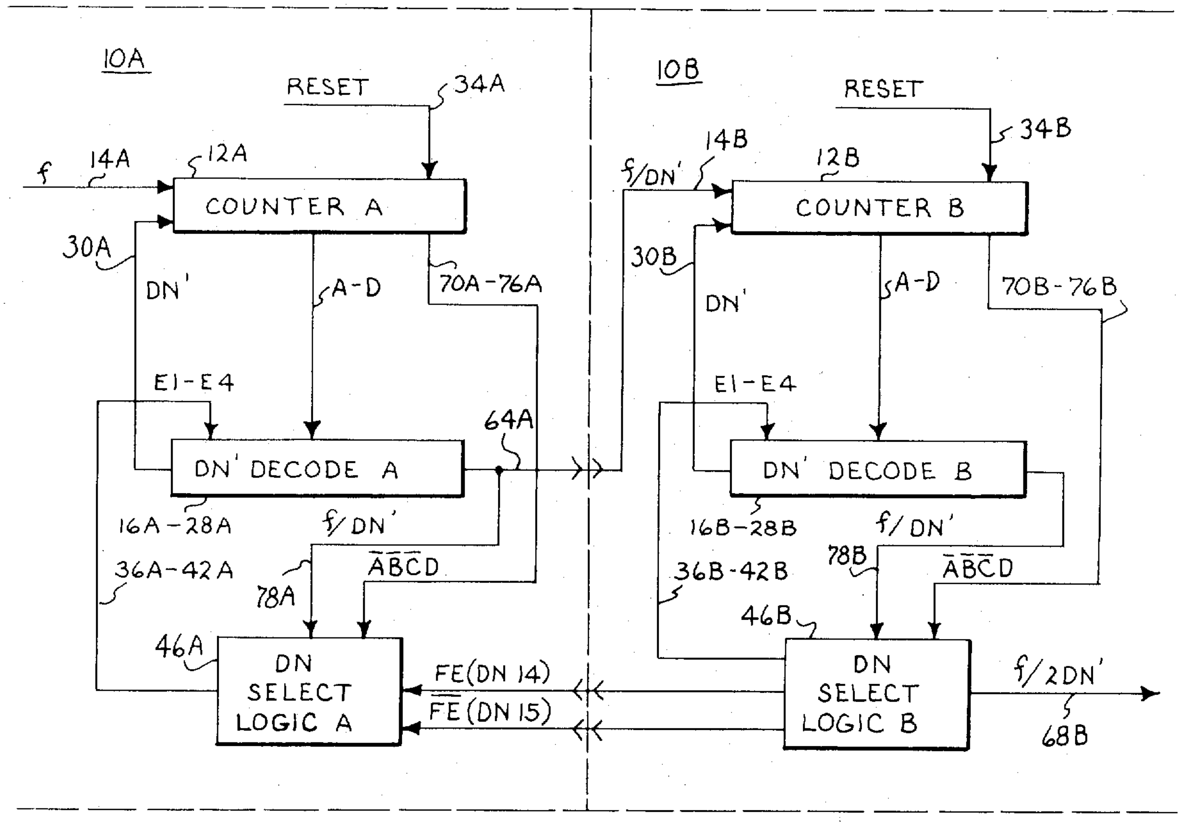
FIG. 3 is a block diagram of two shift register counter modulo N divider networks of the present invention connected in cascade.

The operation of the invention will now be described with two counter networks 10 like that shown in FIG. 1 connected in cascade for dividing by a number greater than the maximum capacity of one divide network. Referring to FIG. 3, there is shown in block diagram form two of the networks 10 interconnected in cascade wherein 10A represents one of the networks and 10B represents another of the networks. Further, each of the numerals in networks 10A and 10B of FIG. 3 have alphabetic suffixes indicating the relationships of the various component parts to those corresponding parts in FIG. 1. A similar type of notation is utilized in FIG. 4 which shows the DN select logic 46A associated with network 10A and the DN select logic 46B associated with network 10B.

Whenever it is desirable to divide by any number greater than 32, two of the counters are interconnected in a fashion as shown in FIG. 3. The example shown, and as to be described, is an interconnection of the two networks 10A and 10B for dividing by the number 231. When dividing by any number greater than 32, the present invention takes advantage of the fact that any number can be divided into a two-term summation or addition of the multiplication of adjacent integers or numbers, such as X(Z) + Y(Z + 1). Using this formula to set up the networks 10A and 10B to divide by the number 231, one would proceed by the following steps:

Step 1;

Divide the number 231 by 2 until all quotients are less than or equal to 16. Halves are not permitted.

2 | 231

2 | 115 + 116

2 | 57 + 58 + 58 + 58

2 | 28 + 29 + 29 + 29 + 29 + 29 + 29 + 29

14 + 14 + 14 + 15 + 14 + 15 + 14 + 15 + 14 + 15 + 14 + 15 +

14 + 15 + 14 + 15

Step 2;

Collect all of the like terms:

X(Z) + Y(Z + 1)

9(14) + 7(15)

where $X$ equals the number of 14's, $Z$ equals the number 14 and where $Y$ equals the number of 15's and (Z + 1) equals the number 15.

Step 3;

List the numbers in step 2 DN' as follows:

DN' = 7, 9, 14 and 15

Figure 4:
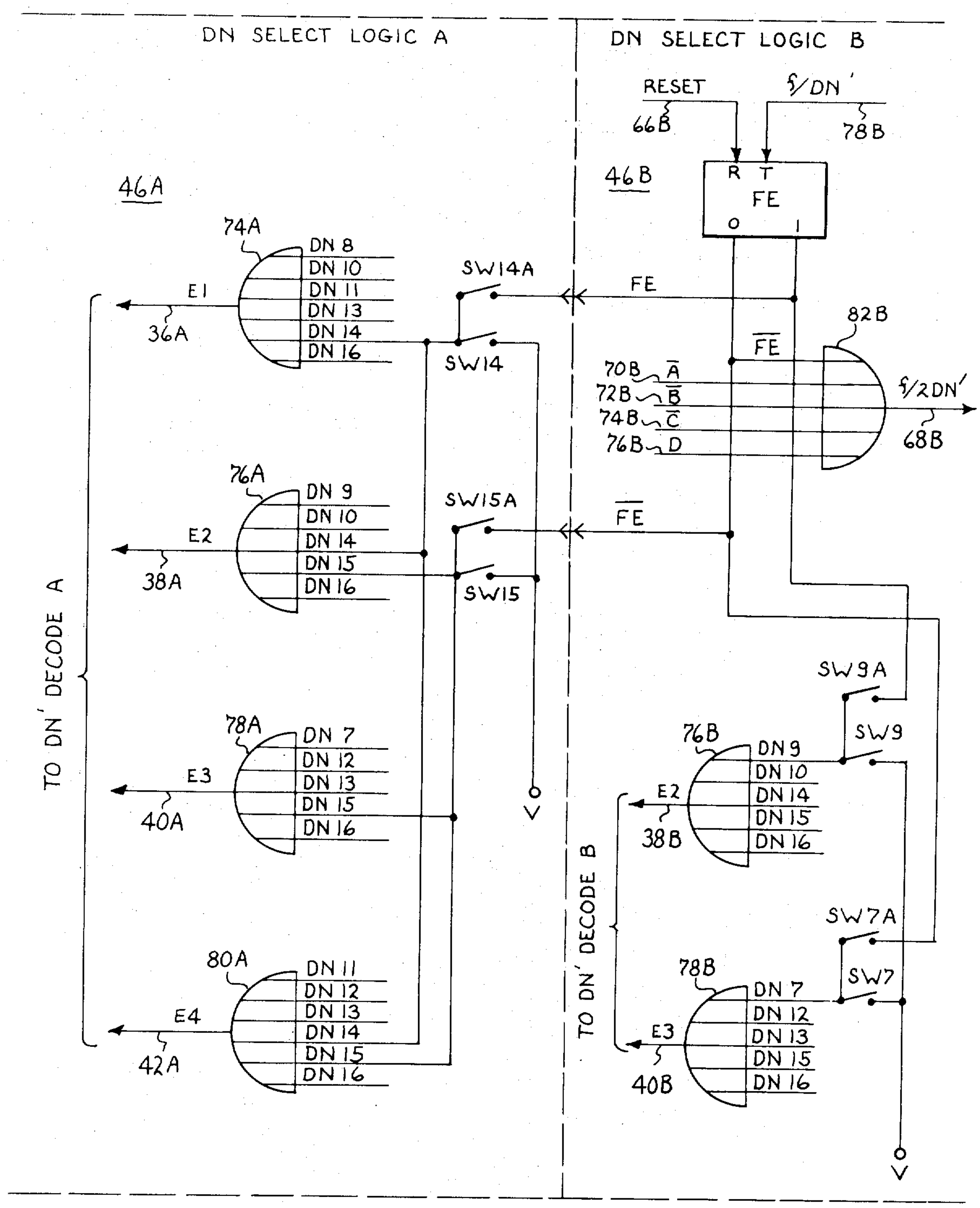
FIG. 4 is a logic schematic showing details of the interconnections of the divider networks of FIG. 3.

Reference is now made to FIG. 4 which shows how the above calculated numbers can be selected in the DN select logic 46A and 46B to set up the two networks 10A and 10B to divide by two numbers in a fashion similar to that described for the divide by 17 operation. First the DN select logic 46B is set up to divide by the two numbers 9 and 7. This is effected by closing a switch SW9A to provide the input signal FE to the DN9 input at OR gate 76B and by closing a switch SW7A to provide the signal $\overline{FE}$ to the DN7 input of OR gate 78B. In the DN select logic 46A, the network 10A is set up to divide by the two numbers 14 and 15 by closing a switch SW14A to provide the signal FE to the DN14 input of OR gates 74A, 76A and 80A and by closing the switch SW15A to provide the signal $\overline{FE}$ to the DN15 input of OR gates 76A, 78A and 80A. It will be noted that the flip-flop FE in the DN select logic 46B is utilized to control the divide cycle of both networks 10A and 10B simultaneously. For example, when the flip-flop FE is in the reset state, its 0 output terminal applies a binary 1 signal, via switch SW7A to the DN7 input of OR gate 78B and via switch SW15A to the DN15 input of OR gates 76A, 78A and 80A. In this fashion, during a first portion of the divide operation, the divide network 10A will divide by 15 whereas the divide network 10B will divide by 7 in response to the input signal $f$/DN' provided to the input of counter 12B (FIG. 3) via conductors 64A and 14B. In the second portion of the divide cycle the FE flip-flop in select logic 46B will be in a set state. During this portion, a binary 1 signal from the 1 output terminal of flip-flop FE will be applied via switch SW9A to the DN9 input of OR gate 76B and via switch SW14A to the DN14 input of each of the OR gates 74A, 16A and 80A.

With the above switch settings now established, let it first be assumed that a reset pulse has been applied via lines 34A, 34B and 66B to the counters 12A, 12B and flip-flop FE as shown in FIGS. 3 and 4. The entire divide network is now in a reset condition ready to receive the first input signal $f$ on line 14A which is applied to the input of counter 12A of FIG. 3. With flip-flop FE in the reset state the binary 1 signal $\overline{FE}$, via switch SW15A, enables OR gates 76A, 78A and 80A to provide the proper input enable signals E2, E3 and E4 to the inputs of AND gates 18, 22 and 24 in the DN' decode A of divide network 10A. The counter 12A will begin to count and upon the detection of a count of 15 the DN' decode A generates the output signal $f$/DN' on conductor 64A which is applied to the input of counter 12B on conductor 14B. Counter 12A will continue to count the sequentially applied input signals $f$ and generate an output signal $f$/DN' every 15 input signals. Since divide network 10B is selected to divide by the number 7 on the first portion of the divide cycle, after seven input signals $f$/DN' have been counted by counter 12B the DN' decode B generates its corresponding output signal $f$/DN' on conductor 78B which is applied to the T input terminal of flip-flop FE. This latter signal will cause flip-flop FE to achieve a set state. At this time, the divide network has counted 15 × 7 input signals *f*, thus dividing by 105.

With flip-flop now in the set state, a binary 0 signal is applied to the DN7 input of OR gate 78B via switch SW7A disabling that OR gate. In a similar fashion, the binary 0 signal from the 0 output terminal of flip-flop FE is applied via SW15A to OR gates 76A, 78A and 80A disabling these latter gates from generating divide by 15 output enable signals E2, E3 and E4. The 1 output terminal of flip-flop FE is now applying a binary 1 signal via switch SW14A to the DN14 input terminals of OR gates 74A, 76A and 80A, thus enabling these gates to set up the divide network 10A to divide by the number 14. In a similar fashion, the binary 1 signal from the 1 output terminal flip-flop FE is applied via switch SW9A to the DN9 input of OR gate 76B. This now sets up the network 10B to divide by the number 9.

The next input signal *f* (106), causes counter 12A to begin the divide by 14 operation, or the second portion of the entire divide by 231 operation. In the manner as previously described, each time counter 12A counts 14 input signals *f*, it will generate one output signal *f*/DN' causing counter 12B to count. When counter 12B receives 9 *f*/DN' input signals, DN' decode B will again generate its corresponding *f*/DN' output signal on conductor 78B causing flip-flop FE to return to the reset state.

During the second portion of the divide by 231, the divide network has divided 14 × 9 input signals *f* which equals 126. Thus, it can be seen that the first divide operation which divided by 105 and the second divide operation which divided by 126 when added together equal 231. This divide by 231 is detected and provided as an output signal from OR gate 82B from the DN select logic 46B as shown in FIG. 4.

The preceding description of the invention has provided exemplary structures using mechanical switches to illustrate how the DN select logic 46 can control the generation of the enable signals E1–E4 for controlling the various selected divide operations within either one or both of the networks 10A and 10B. However, it will appear immediately obvious to one skilled in the art that there are other ways to design select logic of this type using all solid-state logic elements. Further, not all possible divide number logic has been shown. For example, referring to FIG. 2, switches SW9, SW16, SW10 and SW8 have been shown as examples of how the divider may be activated or selected to divide by the numbers 9, 16, 10 and 8. Also, the switches SW32 and SW17 have been shown to indicate how the divider may be selected to divide by the numbers 32 or 17. It is of interest to note that only one switch such as SW32 is required to divide by any number which can be divided into two equal parts, since it is only necessary for the divide network to cycle through the numbers twice to derive the selected divide number. The above formula given for setting up two divide networks, in cascade, may be applied to divide by any number greater than 32 when using two four-stage counters as disclosed.

While the principles of the invention have now been made clear in an illstrative embodiment, there will be immediately obvious to those skilled in the art many modifications of structure, arrangement, the elements, materials and components used in the practice of the invention and otherwise, which are particularly adapted for specific environments and operating requirements without departing from those principles. The appended claims are, therefore, intended to cover and embrace any such modifications within the limits only of the true spirit and and scope of the invention.

What is claimed is:

1. A divider network for dividing sequentially occurring input signals comprising:

a. a counter including one through N binary cells, each capable of achieving first and second states and generating binary output signals representative of said states, said counter responsive to said input signals to effect the counting thereof and said one of said binary cells further being responsive to applied control signals for controlling the states of said one binary cell, the state of said one binary cell being sequentially transferred through the other binary cells of said counter to continuously control the count therein during a divide sequence;

b. select means for generating at least one output enable signal representative of a number by which said input signals are to be divided;

c. decode means responsive to the binary output signals from said binary cells and to the at least one output enable signal from said select means for providing the control signals to said one binary cell, said control signals changing during the divide sequence to alter the state of said one binary cell in accordance with the number specified by the at least one output enable signal when said counter achieves a specified count associated with an individual one of said at least one output enable signal; and d. output means responsive to the binary output signals from said binary cells for generating an output signal representative of a number of said input signals applied to said counter divided by the number represented by the at least one output enable signal from said select means when the Nth binary cell is in its first state and the remaining binary cells are each in their second state.

2. a divider network for selectively dividing sequentially occurring input signals comprising:

a. a counter including one through N binary cells, each capable of achieving first and second states and generating binary output signals representative of said states, said counter responsive to said input signals and to applied control signals, said control signals controlling the states of said binary cells at the time of occurrence of said input signals;

b. decode means responsive to the binary output signals from said binary cells and to a plurality of enable signals for providing the control signals to said counter, said enable signals collectively representing a number by which said input signals are to be divided, and each of said plurality of enable signals effecting a respective recognizable change in said control signals when said counter achieves a specified count associated with a corresponding one of said enable signals;

c. first output means responsive to the binary output signals from said binary cells for generating a first output signal representative of a number of said input signals applied to said counter divided by the number represented by said plurality of enable signals when the Nth binary cell is in its first state and the remaining binary cells are each in their second state;

d. select means including a control element capable of achieving first and second states and generating first and second logic signals representative of the states of said control element in response to said first output signal from said first output means, said select means further including select logic for providing, in a first instance, a first one of the enable signals to said decode means in response to the first logic signal from said control element when said control element is in its first state and providing, in a second instance, a second one of the enable signals to said decode means in response to the second logic signal from said control element when said control element is in its second state; and e. second output means responsive to the binary output signals from said binary cells and to the first logic signal from said control element for generating a second output signal representative of a number of said input signals applied to said counter divided by the number represented by the first and second enable signals when the Nth binary cell is in its first state, the remaining binary cells are in their second state and when said control element achieves its first state.

3. A divider network for dividing sequentially occurring input signals comprising:

a. first and second counters, each including N binary cells capable of achieving first and second states and generating binary output signals representative of said states, said first counter responsive to first sequentially occurring input signals and said second counter responsive to second sequentially applied input signals, said first and second counters responsive to first and second control signals respectively for controlling the states of said binary cells at the time of occurrence of the first and second input signals applied to said first and second counters respectively;

b. first and second decode means associated with said first and second counters respectively, each of said decode means including means responsive to the binary output signals from the binary cells of their respective counters and each responsive to enable signals for providing the control signals to their respective counters, said enable signals collectively representing a number by which the first input signals applied to said first counter are to be divided and each of said enable signals effecting a respective recognizable change in said control signals when each of said counters achieves a specified count associated with a corresponding one of said enable signals, said first decode means further including first output means responsive to the binary output signals from the binary cells of said first counter for applying said second input signals to said second counter as a signal representative of a number of the first input signals applied to said first counter divided by a number represented by the enable signals of said first decode means when the Nth binary cell of said first counter is in its first state and the remaining binary cells are each in their second state;

c. first and second select means associated with said first and second decode means respectively, said second select means including a control element capable of achieving first and second states and generating first and second logic signals respectively representative of the states of said control element in response to the second input signal from said first output means, each of said select means including select logic for providing, in a first instance, a first one of the enable signals to their respective decode means in response to the first logic signal from said control element and providing, in a second instance, a second one of the enable signals to their respective decode means in response to the second logic signal from said control element, said second decode means further including second output means responsive to the binary output signals from the binary cells of said second counter and to the first logic signal from said control element for generating a final output signal representative of a number of the first input signals applied to said first counter divided by the sum of the numbers represented by the enable signals.

4. A divider network for dividing sequentially occurring input signals comprising:

a. a shift register counter including one through N flip-flops, each capable of achieving first and second states and generating binary output signals representative of said states, each of said flip-flops receiving said input signals for simultaneously operating said flip-flops, said one of said flip-flops further receiving applied control signals, said control signals controlling the states of said one of said flip-flops at the time of occurrence of said input signals;

b. select means for selectively generating output enable signals representative of a number by which said input signals are to be divided;

c. a plurality of AND gates, each receiving a binary output signal from specified ones of said flip-flops, and specified ones of said AND gates each receiving a one of the output enable signals from said select means, the specified ones of said plurality of AND gates each generating a logic term signal in response to a received output enable signal when the binary output signals received thereby represent a prescribed count in said counter;

d. an OR gate responsive to the logic term signal generated by each of said plurality of AND gates for providing the control signals to said one of said flip-flops in accordance with a recognizable change effected by each logic term signal; and e. an output AND gate responsive to the binary output signals from said flip-flops for generating an output signal representative of a number of the input signals applied to said counter divided by a number represented by the output enable signals of said select means when the Nth flip-flop is in its first state and the remaining flip-flops are each in their second state.

5. A divider network for dividing sequentially occurring input signals comprising:

a. a counter including one through N flip-flops, each capable of achieving set and reset states and generating binary output signals representative of said states, each of said flip-flops responsive to a reset signal for resetting said counter, each of said flip-flops receiving said input signals for simultaneously operating said flip-flops, and said one of said flip-flops further receiving applied control signals for controlling the states of said one of said flip-flops at the time of occurrence of said input signals;

b. a plurality of OR gates, each having input terminals for receiving logic signals collectively representative of a number by which the input signals are to be divided and each generating an output enable signal in response to logic signals selectively applied thereto;

c. switch means for selectively connecting the logic signals to the input terminals of said plurality of OR gates;

d. a control flip-flop capable of achieving set and reset states and responsive to said reset signal for placing said control flip-flop in a reset state, said control flip-flop further responsive to a first output signal and being connected to said switch means for providing said logic signals thereto in accordance with the states of said control flip-flop;

e. means responsive to the binary output signals from said one through N flip-flops and to the output enable signal from each of said plurality of OR gates for providing the control signals to said one of said flip-flops, each output enable signal effecting a respective recognizable change in the control signals when said counter achieves a specified count associated with a corresponding one of said output enable signals;

f. first output means responsive to the binary output signals from said flip-flops of said counter for providing said first output signal to said control flip-flop when the Nth flip-flop is in its set state and the remaining flip-flops are each in their reset state; and g. second output means responsive to the first output signal and to one of the logic signals from said control flip-flop for generating a second output signal representative of a number of the input signals applied to said counter divided by the number represented by the logic signals applied to said plurlaity of OR gates from said control flip-flop.

6. In a divider network of the type having a shift register counter comprised of one through N binary cells, each capable of achieving first and second states and generating binary output signals representative of said states, a method of dividing input signals sequentially applied to said counter, comprising the steps of:

a. generating at least one divide signal representative of a number by which said input signals are to be divided;

b. continuously applying control signals to said one binary cell for controlling the states thereof, the state of said one binary cell being sequentially transferred through the other binary cells of said counter to continuously control the count therein during a divide sequence as each input signal is applied to said counter, said control signals exhibiting a recognizable change therein during the divide sequence in accordance with the number specified by the at least one divide signal when said counter achieves a prescribed count associated with an individual one of said at least one divide signal; and c. generating an output signal representative of a number of the input signals divided by the number specified by the divide signal when the Nth binary cell is in its first state and the remaining binary cells are each in their second state.

7. A method of dividing sequentially occurring input signals applied to a counter comprised of one through N binary cells capable of achieving a maximum count N, said method of dividing achieved by dividing by two numbers, the sum of which is greater than N and equal to or less than 2N comprising the steps of:

a. generating a first divide signal representative of the first of said two numbers;

b. continuously applying control signals to said one binary cell for controlling the states thereof, the state of said one binary cell being sequentially transferred through the other binary cells of said counter to continuously control the count therein during a divide sequence as each input signal is applied to said counter, said control signals exhibiting a recognizable change therein during the divide sequence in accordance with the first divide signal when said counter achieves a first prescribed count associated with the first divide signal;

c. storing the completion of dividing by the first divide number when the last binary cell of said counter is in its first state and the remaining binary cells are each in their second state;

d. continuing the divide sequence as a result of storing the completion of dividing by the first divide number by repeating the preceding steps and generating a second divide signal representative of the second of said two numbers, applying the control signals to said one binary cell whereby the control signals exhibit a recognizable change in accordance with the second divide signal when said counter achieves a second prescribed count associated with the second divide signal and storing the completion of dividing by the second divide number; and e. generating an output signal representative of a number of the input signals applied to said one binary cell divided by the sum of said first and second divide numbers as a result of storing the completion of dividing by the second divide number when the last binary cell is in its first state and the remaining binary cells are each in their second state.

* * * * *